Nov. 13, 1934.   G. DUNLOP   1,980,751
WHEEL ALIGNMENT AND TURNING MECHANISM FOR TRAILER CARS
Filed Nov. 8, 1933
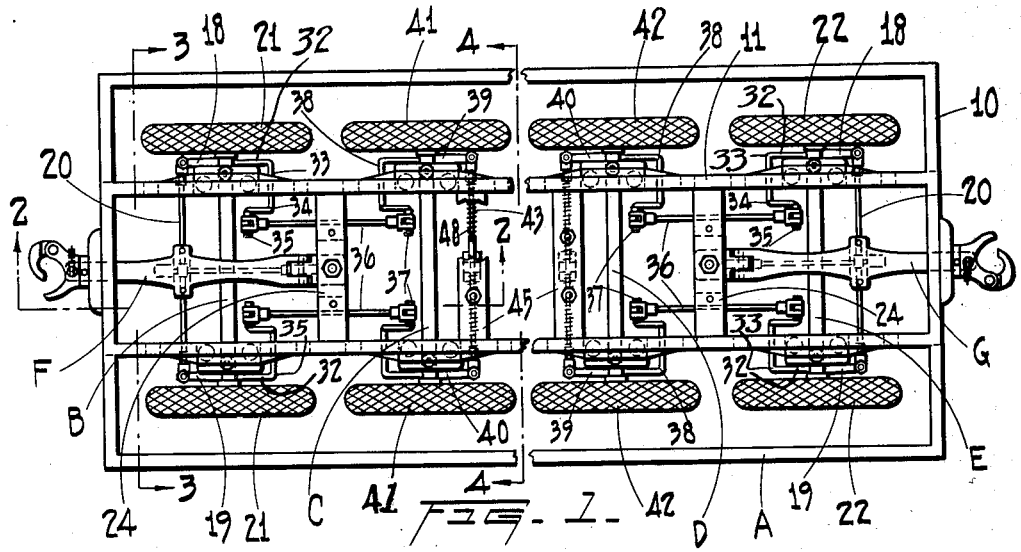
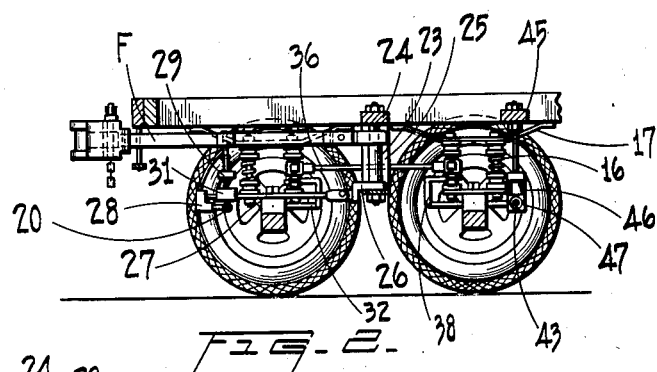
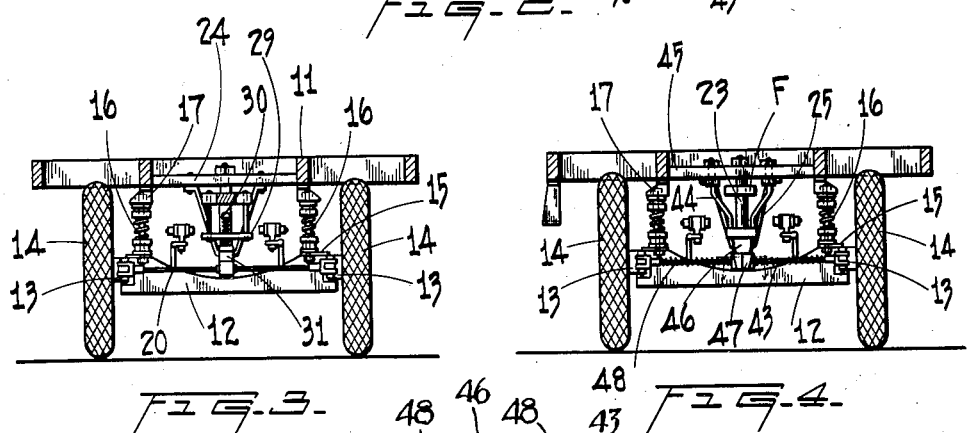
Inventor
Greig Dunlop
By Smart and Biggar
Attys.

Patented Nov. 13, 1934

1,980,751

UNITED STATES PATENT OFFICE 1,980,751

WHEEL ALIGNMENT AND TURNING MECHANISM FOR TRAILER CARS

Greig Dunlop, Saskatoon, Saskatchewan, Canada

Application November 8, 1933, Serial No. 697,145

6 Claims. (Cl. 280—33.5)

This invention relates to wheel alignment and turning mechanism for trailer cars, and an object of the invention is to provide a practical and comparatively simple construction as between the trucks of a trailer car for maintaining the wheels in alignment while permitting the turning of the wheels of two or more trucks in unison, the turning movement of the wheels of one truck being duplicated by the succeeding truck or trucks according to the number employed.

A further object of the invention is to provide a mechanism of this character applied to two groups of trucks carried by a trailer car wherein one of said groups will be moved from alignment to follow the course of the hauling vehicle while the other of said groups will be maintained in alignment similar to the rear wheels of a motor truck, motor car or the like, or will be moved out of alignment to follow the course of the hauling vehicle in the case where the hauled trailer has a further trailer attached thereto.

A still further object of the invention is to provide a mechanism of this character which may be manufactured at a comparatively low cost and assembled with relatively little effort.

With these and other objects in view, the invention consists essentially in mechanism mounted on a trailer connected between two or more trucks forming a group, the mechanism embodying a draw bar connected with the wheels of one truck, and connecting mechanism between the wheels of said truck and the wheels of a second and third truck, if employed, to duplicate in the latter truck the turning movement of the wheels of the first truck, with the provision of means for maintaining the wheels of the several trucks in proper alignment when the vehicle is travelling in a straight line. The invention also embodies such mechanism as applied to two separate groups of trucks mounted on the vehicle to permit relative turning movement of the wheels of each group of trucks on the vehicle or trailer in the case where a second trailer is connected to the first one, as more fully described in the following specification and illustrated in the accompanying drawing which form part of the same.

In the drawing:—

Figure 1 is a top plan view of the framework of a trailer which is broken away for the sake of clarity, the trucks and connections therebetween being clearly illustrated below the framework.

Figure 2 is a longitudinal section taken on the line 2—2 of Figure 1.

Figure 3 is a transverse section taken on the line 3—3 of Figure 1.

Figure 4 is a transverse section on the line 4—4 of Figure 1, and,

Figure 5 is an enlarged fragmentary section taken through the bracket connecting with one of the radius rods in each group of trucks.

Referring more particularly to the drawing, A indicates any suitable trailer framework including the transverse end beams 10 and the longitudinal beams 11. Mounted on the framework A are a plurality of trucks B, C, D and E which are grouped together in pairs, it being apparent that, while the drawing discloses only pairs of trucks, three might readily form a group positioned at each end of the trailer.

The construction of the trucks B, C, D and E is practically similar throughout. This includes the axle 12 to which are pivotally connected the stub axles 13 carrying the wheels 14. On the axle 12 are mounted the spring planks 15 carrying the shock absorbing springs 16 in suitable fittings which connect with the load carrying brackets 17 firmly bolted to the longitudinal beams 11 of the trailer. This structure prevails in the construction of each truck.

To the stub axles of trucks B and E operating levers 18 and 19 are connected to provide for turning movement of the wheels, these operating levers projecting forwardly of the axle, as illustrated. The levers 18 and 19 in the trucks B and E are connected by the radius rod 20 so that the wheels 21 of truck B will turn together and likewise wheels 22 of truck E may be turned together, the turning movement being effected through the draw bars F and G respectively which are connected with the radius rod 20. In this instance the draw bars are swingably mounted on the king pins 23 mounted between the short cross beam 24 on the framework and a depending bracket 25 connected thereto. The connection between the draw bars F and G and the radius rod 20 includes a swingable connecting piece 26 on the king pin below its connection with the draw bar, as illustrated in Figure 2, the connecting piece 26 pivotally carrying a connecting link 27 rigidly fastened to a crevice block or the like 28 which is secured on the radius rod 20. Connection is then made between the connecting link 27 and the draw bars F or G, as the case may be, by means of a depending bracket 29 mounted on the draw bar and a pin 30 connecting with the bracket 29 on the one hand and with a block 31 secured to the connecting link 27 on the other, with the provision of coil springs on the pin 30 between the bracket and block referred to to provide for any necessary play. In this way, by moving either the draw bar F or draw bar G to the right or left, the movement is translated through the pin 30 and other connections described to the radius rod 20 and thus transmitted to wheels 21 in truck B or wheels 22 in truck E, so that they will turn in unison to the right or left in accordance with the movement of their draw bars.

Also connected to the stub axles of the wheels 21 and 22 in trucks B and E are the rods 32 which preferably are a continuation of the levers 18 and 19 projecting on the other side of the axles 12. The rods 32 are bent as at 33 and 34 to form cranks, as at 35, to which are pivotally connected tie rods 36, clearly illustrated in Figure 1. The opposite ends of the tie rods 36 connect with the cranked portion 37 of the rods 38 in trucks C and D which, as is clearly evident from Figure 1, correspond to the rods 32 in the truck structures B and E. The rods 38 in trucks C and D similarly connect with the stub axles and the levers 39 and 40 preferably integral with the rods 38 projecting on the opposite sides of the axles of the trucks C and D function in a similar manner to the levers 18 and 19 in trucks B and E; that is, to provide for simultaneous movement of the wheels 41 and 42 in trucks C and D respectively. To this end the levers 39 and 40 are connected by the radius rods 43. A further function is performed through these latter radius rods, however, and that is the maintenance of wheel alignment throughout each truck in a group; when the wheels of each truck are not influenced by a movement of the draw bars F and G. To this end a depending bracket structure 44 (see Figure 4) is mounted on a suitable cross beam 45 of the trailer framework terminating in a bifurcated bracket 46 through which the radius rods 43 pass.

On the radius rods 43 at this point means for stabilizing the movement of the truck wheels proportionately to the load is provided in the form of two disengageable members 47 which are bored for slidable mounting on the radius rods 43. These disengageable members are designed nominally to abut a bifurcated bracket 46, which latter is formed with a tapered substantially wedge-shaped outline so that if this bracket were pressed downwardly it would tend to separate the disengageable members from each other. On the radius rods 43 mounted between the disengageable members and the levers 39 and 40 of trucks C and D are compression springs 48 which exert a pressure between the members and the levers referred to. This constant pressure will serve to hold the wheels 41 and 42 in parallel relation, and in so doing will also hold the wheels 21 and 22 in this relation due to the connecting links 36 which through the rods 32 and 38 provide for a duplicate movement or position of the wheels 41 and 42 with respect to the wheels 21 and 22.

When the load is increased on the trailer the slight downward movement of the truck frame will be transmitted through the bracket 44 and the wedge shaped contour of bracket 46 will tend to move the disengageable members 47 outwardly from each other thus increasing the force of the compression springs 48 so that any movement of the wheels out of alignment or returning to alignment will be substantially in proportion to the weight being carried by the trailer. On the other hand, regardless of this feature it is quite apparent that the compression springs 48 generally function to maintain the wheels of each truck in alignment with each other parallel to the longitudinal beams of the trailer when the trailer is being hauled along a straight stretch of roadway, these springs also functioning to prevent a loose swinging of the wheels.

In the case where one trailer alone is being towed and the towing vehicle moves around a curve this turning movement will be transmitted through the coupler of the draw bar F to the draw bar which will swing in that direction. Thus each pair of wheels 21 and 41, through the radius rod 20 and radius rod 43 actuated by the connecting parts described, will be turned simultaneously in the proper direction and to a degree suitable to the degree of curve, having regard to the extent that the draw bar F is displaced. In this way the trailer will gracefully round the curve and the wheels on the rear trucks D and E, being held in their normal position aligned with one another due to the fact that the draw bar G is not acted upon, will round the curve in a similar manner to the rear wheels of a motor truck, motor car or the like. On the other hand, when a second trailer is attached to the first through draw bar G, the rounding of a curve in a highway will result in a simultaneous turning of the wheels in trucks D and E due to the fact that the second trailer will exert a pull on the draw bar G and cause it automatically to move in a direction to turn the wheels through the various connections in a manner similar to that described in connection with trucks B and C.

Any number of trailers may be linked up together in this way and it will be obvious that there will be no danger of accident through undue swerving of the trailers due to the automatic action of the wheels in each group of trucks which is at once taken care of by the natural movement of the couplers F and G. On the other hand, just as soon as curves have been rounded and the train of vehicles reaches a straight stretch of roadway, the movement of the couplers will tend to move each wheel back to its normal position in alignment with the wheel in advance, whereas the coil springs 48 will assure proper alignment owing to the pressure they exert upon the connections with the radius rods 43.

It will be apparent from the foregoing, therefore, that I have provided a construction which will readily permit the linking of a number of trailers with entire safety and without causing a road hazard, while providing for a smooth travel of the trailer with a compensating action, having regard to the negotiation of curves and return to straight stretches of roadway. In other words, regardless of the winding character or straight character of the road, the action of the trailer will be such that it will automatically negotiate curves following the towing vehicle and will automatically align its wheels on returning to straight stretches, as well as changing the degree to which the wheels may be turned according to the degree of the curves in the road as negotiated by the hauling vehicle.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

I claim:

1. Wheel alignment and turning mechanism for trailer trucks and the like comprising a trailer framework, a plurality of wheeled trucks supporting the framework, said trucks being disposed in groups, a draw bar swingably mounted on the framework, radius rods extending between the wheels of each truck, connecting means between one of said radius rods and draw bar, link connections between the corresponding wheels of adjacent trucks in a group whereby on movement of the draw bar the wheels of each truck in a group will move to a corresponding degree in the same direction, and a spring means carried on one of said radius rods extending between the wheels of one truck and a part of the frame for maintaining the wheels in alignment when not influenced by the draw bar.

2. Wheel alignment and turning mechanism for trailer trucks and the like comprising a framework, a plurality of wheeled trucks supporting the framework, said trucks being disposed in groups, said wheels being swingably mounted on said trucks, a lever projecting from the wheel mountings of each truck on one side of the truck axle, radius rods connecting the levers of opposite wheels, a bent rod extending from the mounting of each wheel on the opposite side of the axle of each truck, tie rods extending between the rods of the wheels on each side of the trucks and between the trucks in the same group, a draw bar swingably mounted on the framework, connecting means between the draw bar and one of the radius rods whereby said wheels of one group of trucks will be moved simultaneously in the same direction as the draw bar when the latter is moved, and spring means extending between the framework and the wheels of one of said trucks whereby said wheels will be maintained in alignment when not actuated by the draw bar.

3. The device as claimed in claim 2, in which means are provided for increasing the power of the spring means in respect to the wheels as the load of the vehicle is increased in weight.

4. Wheel alignment and turning mechanism for trailer trucks and the like comprising a trailer framework, a plurality of wheeled trucks supporting the framework, said trucks being disposed in groups, a draw bar swingably mounted on the framework, radius rods extending between the wheels of each truck, connecting means between one of said radius rods and draw bar, link connections between the corresponding wheels of adjacent trucks in a group whereby on movement of the draw bar the wheels of each truck in a group will move to a corresponding degree in the same direction, and means in connection with each group of trucks for maintaining the wheels of said group in alignment when not influenced by the draw bar.

5. Wheel alignment and turning mechanism for trailer trucks and the like comprising a trailer framework, a plurality of wheeled trucks supporting the framework, said trucks being disposed in groups, a draw bar swingably mounted on the framework, connecting means extending between the wheels of each truck, connecting means between one of said radius rods and the draw bar, link connections between the corresponding wheels of adjacent trucks in a group whereby on movement of the draw bar the wheels of each truck in a group will move to a corresponding degree in the same direction, and means operably proportionately to the load carried by the truck for stabilizing turning movement of the wheels.

6. Wheel alignment and turning mechanism for trailer trucks and the like comprising a trailer framework, a plurality of wheeled trucks supporting the framework, said trucks being disposed in groups, draw bars swingably mounted on the framework and connected with each group of trucks, connecting means between one of said radius rods of each group and its draw bar, link connections between the corresponding wheels of adjacent trucks in a group whereby, on movement of the draw bar, said wheels of each truck in a group move to a corresponding degree in the same direction, and spring means in connection with each group of trucks for maintaining the wheels in alignment when not influenced by its draw bar.

GREIG DUNLOP.